US011392199B2

(12) United States Patent
Canberk

(10) Patent No.: US 11,392,199 B2
(45) Date of Patent: Jul. 19, 2022

(54) EYEWEAR WITH SHARED GAZE-RESPONSIVE VIEWING

(71) Applicant: Snap Inc., Santa Monica, CA (US)

(72) Inventor: Ilteris Canberk, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/360,443

(22) Filed: Jun. 28, 2021

(65) Prior Publication Data

US 2021/0405745 A1 Dec. 30, 2021

Related U.S. Application Data

(60) Provisional application No. 63/045,672, filed on Jun. 29, 2020.

(51) Int. Cl.

*G06F 3/01* (2006.01)
*G02B 27/01* (2006.01)
*G06F 3/14* (2006.01)

(52) U.S. Cl.

CPC ......... *G06F 3/013* (2013.01); *G02B 27/0179* (2013.01); *G06F 3/1454* (2013.01); *G02B 27/017* (2013.01); *G02B 2027/0138* (2013.01); *G02B 2027/0178* (2013.01); *G02B 2027/0187* (2013.01)

(58) Field of Classification Search

CPC ..... G06F 3/013; G06F 3/1454; G02B 27/017; G02B 27/0179; G02B 2027/0138; G02B 2027/0178; G02B 2027/0187

USPC .......................................................... 345/156

See application file for complete search history.

(56) References Cited

U.S. PATENT DOCUMENTS

2012/0113092 A1* 5/2012 Bar-Zeev ................ G06F 3/012 345/419
2014/0340389 A1* 11/2014 Lanman ............... G02B 27/017 345/589
2016/0027218 A1* 1/2016 Salter ...................... G06F 3/013 345/633
2016/0321841 A1* 11/2016 Christen .............. G02B 27/017
2018/0005429 A1* 1/2018 Osman .................. G06T 19/006
2018/0122333 A1 5/2018 Horiike
2018/0356885 A1* 12/2018 Ross .................... G06Q 10/101
2019/0086999 A1 3/2019 Ricknäs et al.

(Continued)

OTHER PUBLICATIONS

International Search Report and Written Opinion for International Application No. PCT/US2021/039374, dated Oct. 18, 2021 (dated Oct. 18, 2021)—12 pages.

*Primary Examiner* — Tom V Sheng

(74) *Attorney, Agent, or Firm* — Culhane Meadows PLLC; Stephen J. Weed

(57) ABSTRACT

Eyewear providing an interactive augmented reality experience between two users of eyewear devices to perform a shared group task. During a shared group task session, each eyewear displays the same image. An eye tracker in each eyewear detects a portion of the image the respective user is gazing at. Each eyewear generates an indication of the portion of the respective image each eyewear user is gazing at. The indication is shared with the other eyewear, and the eyewear display indicates the portion of the image the other eyewear user is gazing at. This allows each eyewear user to see what the other user is gazing at when collaborating and visually observing the same image.

20 Claims, 16 Drawing Sheets

100A
105
800
800
800
800
802A
804
806
177C
180
John's Display
808

(56) References Cited

U.S. PATENT DOCUMENTS

| | | | | |
|---|---|---|---|---|
| 2019/0250873 | A1 | 8/2019 | Blume et al. | |
| 2020/0380793 | A1* | 12/2020 | Browy | G02B 27/0172 |
| 2021/0405746 | A1* | 12/2021 | Canberk | G06F 3/1454 |

* cited by examiner

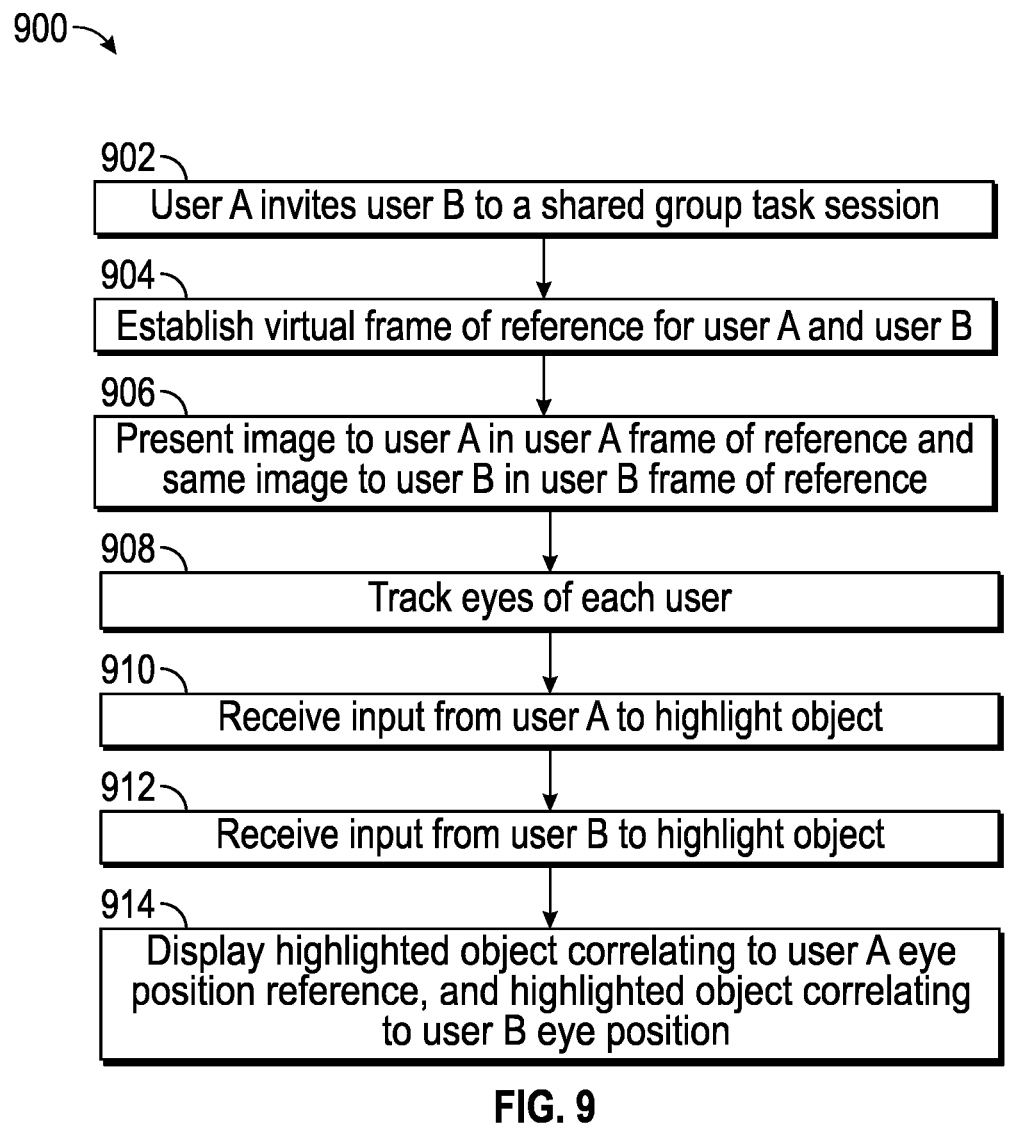

900

902 User A invites user B to a shared group task session

904 Establish virtual frame of reference for user A and user B

906 Present image to user A in user A frame of reference and same image to user B in user B frame of reference 908 Track eyes of each user 910 Receive input from user A to highlight object 912 Receive input from user B to highlight object 914 Display highlighted object correlating to user A eye position reference, and highlighted object correlating to user B eye position

FIG. 9

EYEWEAR WITH SHARED GAZE-RESPONSIVE VIEWING

CROSS-REFERENCE TO RELATED APPLICATIONS

This application claims priority to U.S. Provisional Application Ser. No. 63/045,672 filed on Jun. 29, 2020, the contents of which are incorporated fully herein by reference.

TECHNICAL FIELD

Examples set forth in the present disclosure relate to the field of augmented reality (AR) and wearable mobile devices such as eyewear devices.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems (e.g., touch-sensitive surfaces, pointers), peripheral devices, displays, and graphical user interfaces (GUIs) through which a user can interact with displayed content.

Augmented reality (AR) combines real objects in a physical environment with virtual objects and displays the combination to a user. The combined display gives the impression that the virtual objects are authentically present in the environment, especially when the virtual objects appear and behave like the real objects.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 9 is a flow diagram listing blocks in an example method of displaying virtual objects in an eyewear for first user A and second user B corresponding to FIG. 8A and FIG. 8B.

DETAILED DESCRIPTION

Figure 1A:
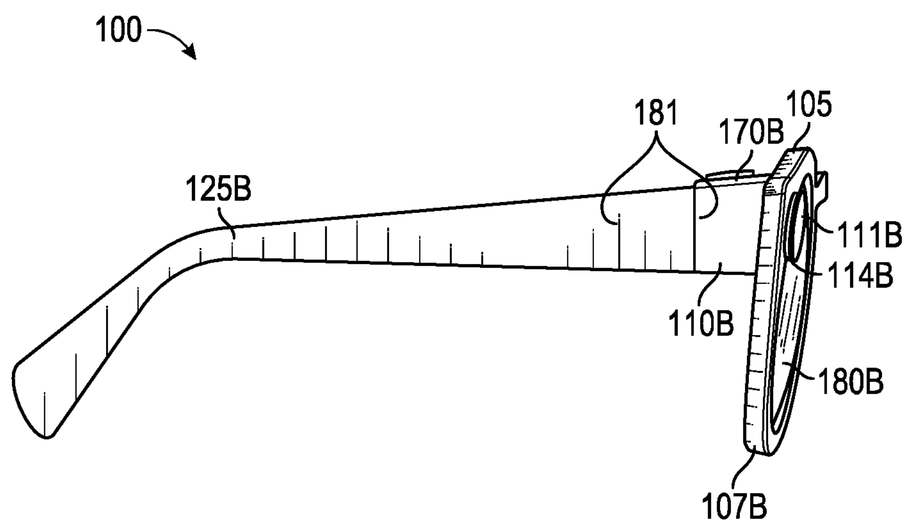
FIG. 1A is a side view (right) of an example hardware configuration of an eyewear device suitable for use in an augmented reality production system.

Eyewear providing an interactive augmented reality experience between two users of eyewear devices to perform a shared group task. During a shared group task session, each eyewear displays the same image. An eye tracker in each eyewear detects a portion of the image the respective user is gazing at. Each eyewear generates an indication of the portion of the respective image each eyewear user is gazing at. The indication is shared with the other eyewear, and the eyewear display indicates the portion of the image the other eyewear user is gazing at. This allows each eyewear user to see what the other user is gazing at when collaborating and visually observing the same image.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms “coupled” or “connected” as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
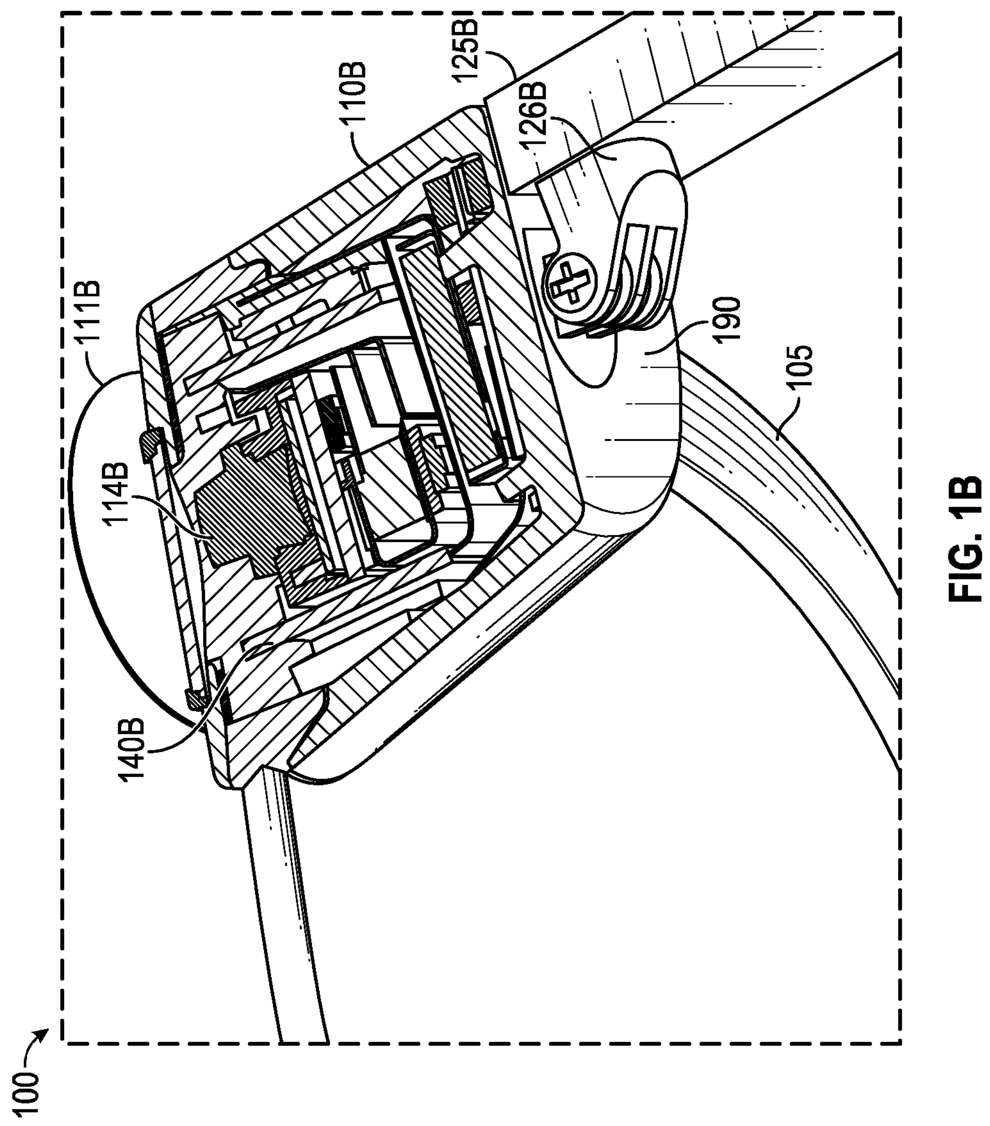
FIG. 1B is a perspective, partly sectional view of a right corner of the eyewear device of FIG. 1A depicting a right visible-light camera, and a circuit board.
Figure 1C:
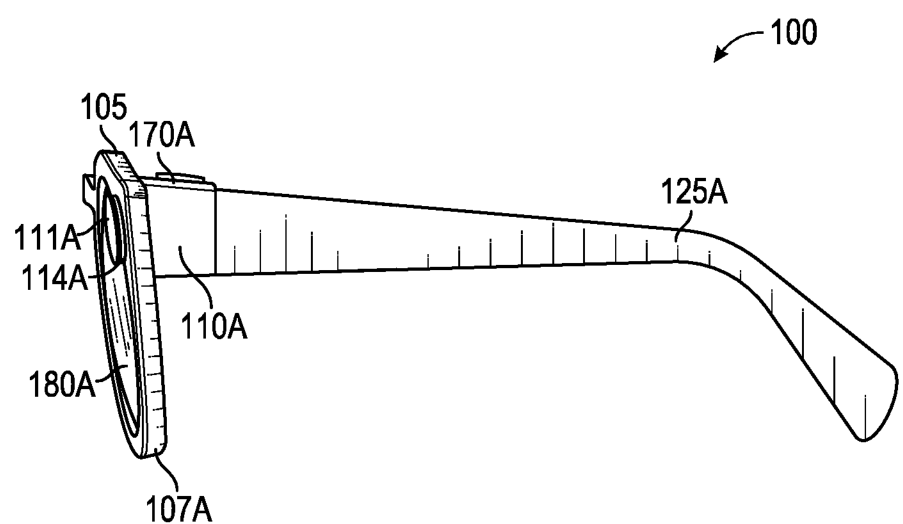
FIG. 1C is a side view (left) of an example hardware configuration of the eyewear device of FIG. 1A, which shows a left visible-light camera.
Figure 1D:
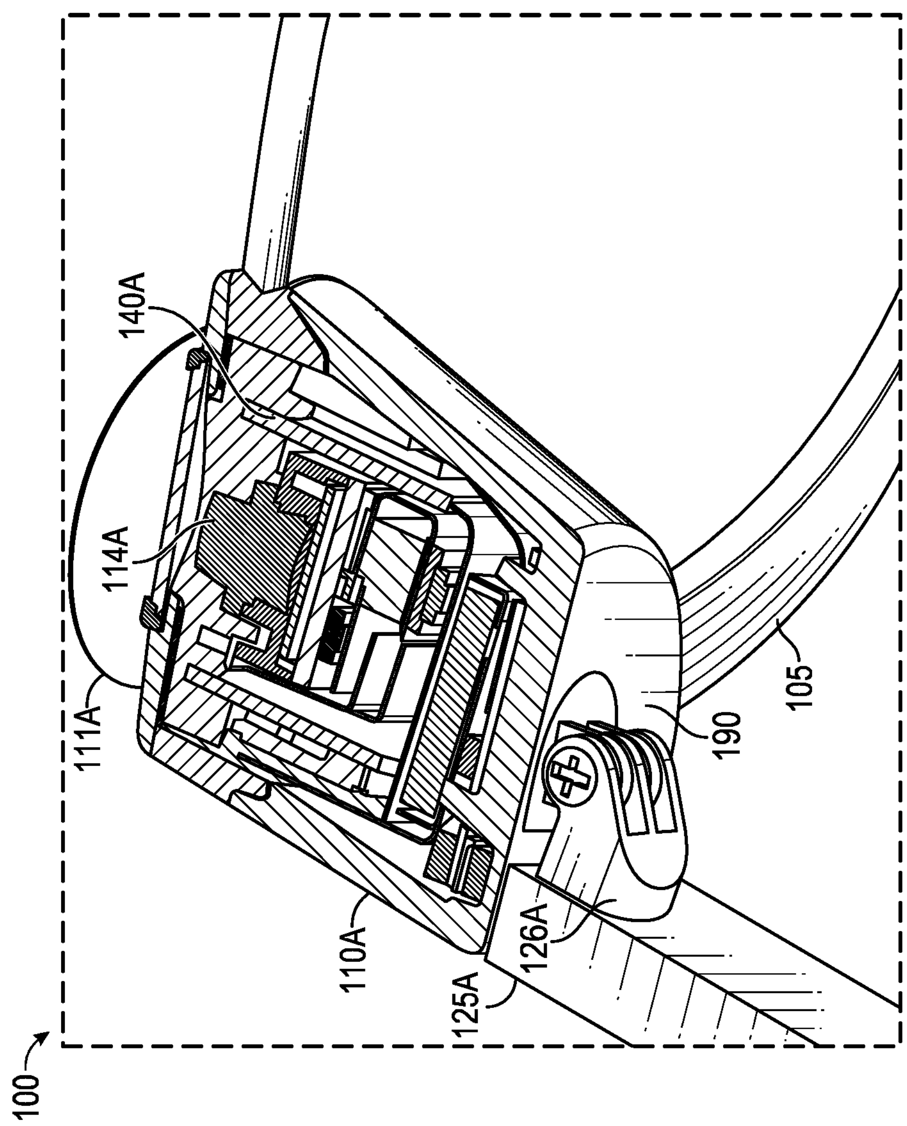
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
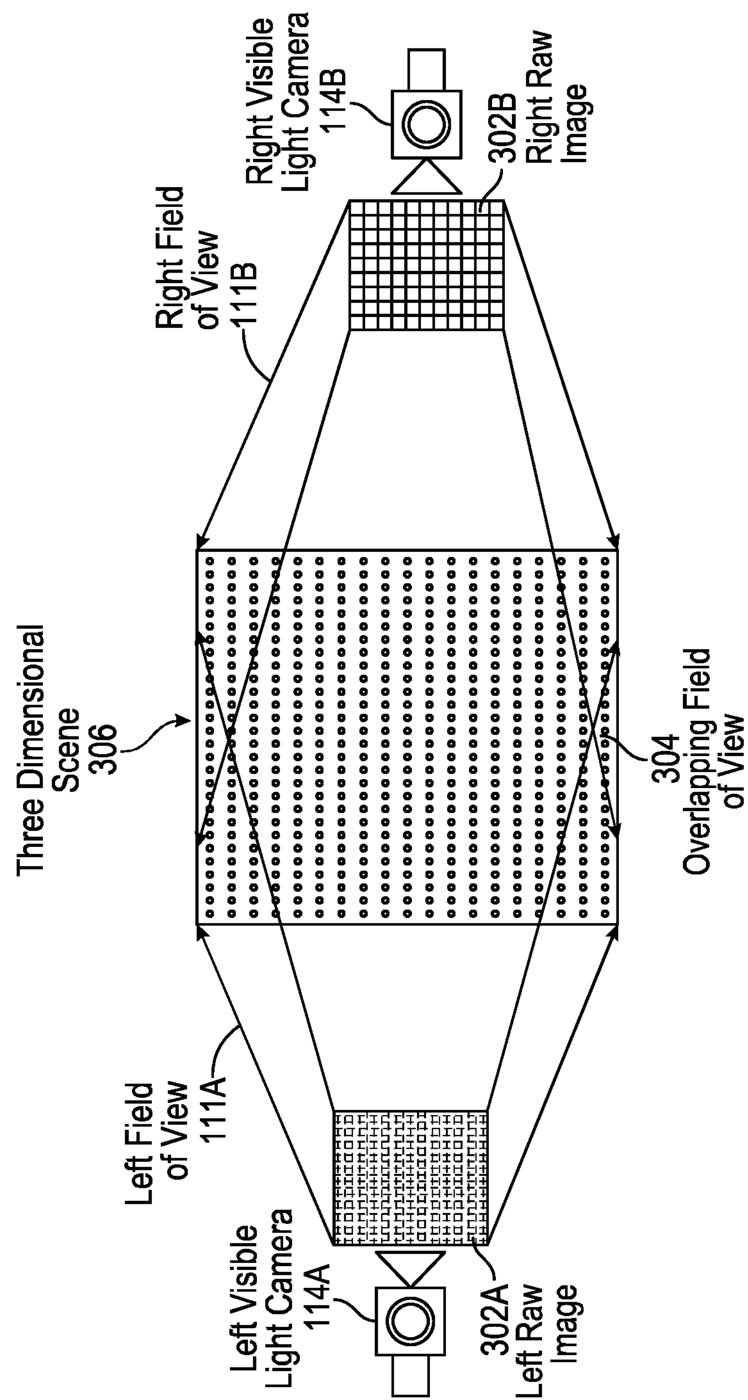
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example, visible-light cameras 114A, 114B have a field of view with an angle of view between 15° to 110°, for example 24°, and have a resolution of 480×480 pixels (or greater). In another example, the field of view can be much wider, such as 100°. The "angle of coverage" describes the angle range that a lens of visible-light cameras 114A, 114B or infrared camera 220 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640*p* (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

The left corner 110A and the right corner 110B includes corner body 190 and a corner cap, with the corner cap omitted in the cross-section of FIG. 1B and FIG. 1D. Disposed inside the left corner 110A and the right corner 110B are various interconnected circuit boards, such as PCBs or flexible PCBs, that include controller circuits for the respective left visible-light camera 114A and the right visible-light camera 114B, microphone(s) 130, speaker 132, low-power wireless circuitry (e.g., for wireless short range network communication via Bluetooth™), high-speed wireless circuitry (e.g., for wireless local area network communication via Wi-Fi).

Figure 2A:
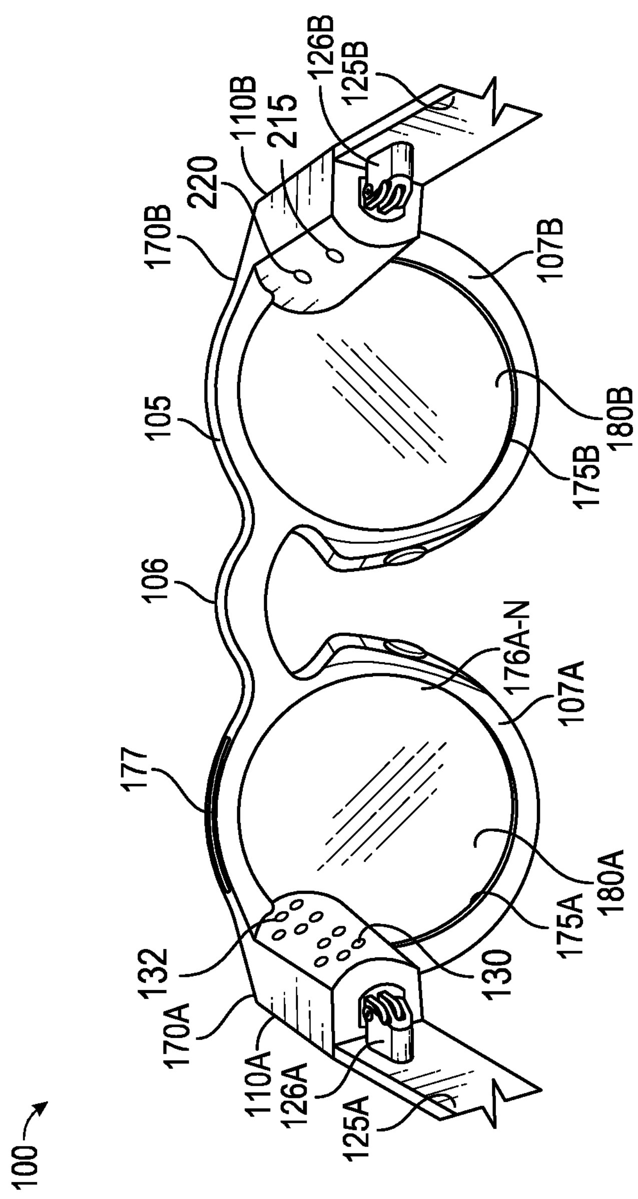
FIGS. 2A and 2B are rear views of example hardware configurations of an eyewear device utilized in the augmented reality production system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
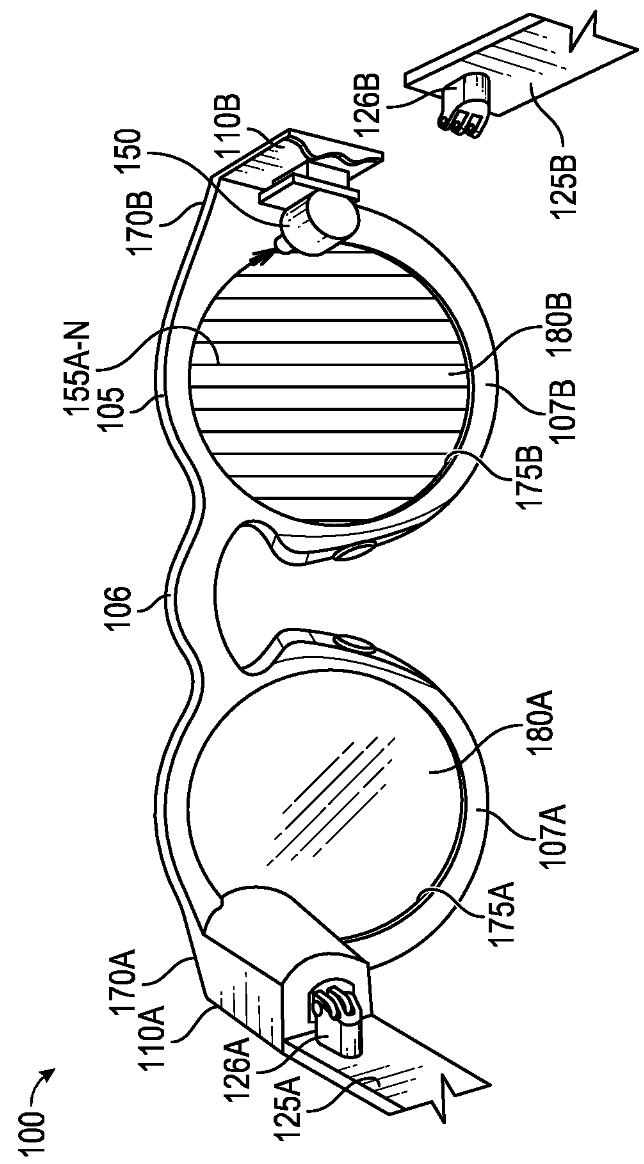

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display 177. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

Figure 2C:
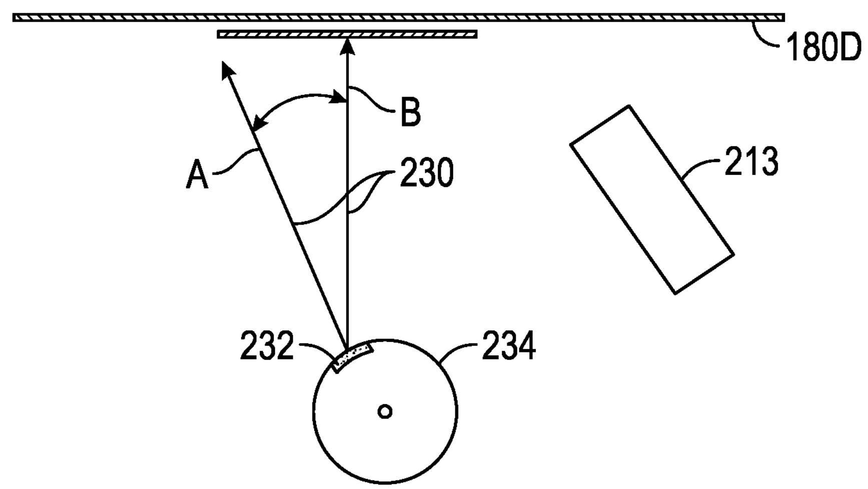
FIG. 2C illustrates detecting eye gaze direction.

Referring to FIG. 2A, the frame 105 or one or more of the left and right temples 125A-B include an infrared emitter 215 and an infrared camera 220, which form an eye tracker 213 (FIG. 2C). The infrared emitter 215 and the infrared camera 220 can be connected to the flexible PCB 140B by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. In another example, the infrared emitter 215 is on the frame 105 and the infrared camera 220 is on one of the temples 110A-B, or vice versa. The infrared emitter 215 can be connected essentially anywhere on the frame 105, left temple 125A, or right temple 125B to emit a pattern of infrared light. Similarly, the infrared camera 220 can be connected essentially anywhere on the frame 105, left temple 125A, or right temple 125B to capture at least one reflection variation in the emitted pattern of infrared light.

The infrared emitter 215 and infrared camera 220 are arranged to face inwards towards an eye of the user with a partial or full field of view of the eye in order to identify the respective eye position and gaze direction. For example, the infrared emitter 215 and infrared camera 220 are positioned directly in front of the eye, in the upper part of the frame 105 or in the temples 125A-B at either ends of the frame 105.

Figure 2D:
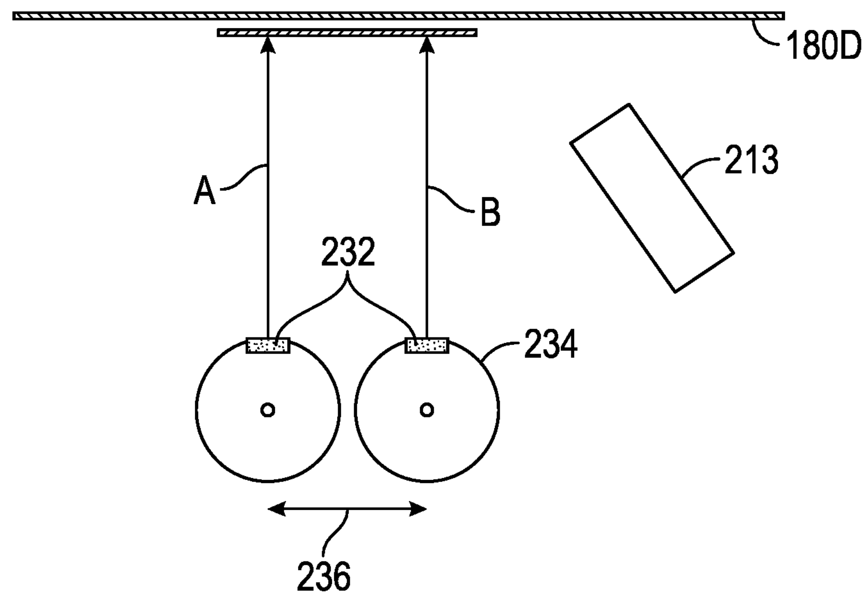
FIG. 2D illustrates detecting eye position.

In an example, the processor 432 utilizes the eye tracker 213 to determine an eye gaze direction 230 of a wearer's eye 234 as shown in FIG. 2C, and an eye position 236 of the wearer's eye 234 within an eye box as shown in FIG. 2D. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a time-stamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the interactive augmented reality system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
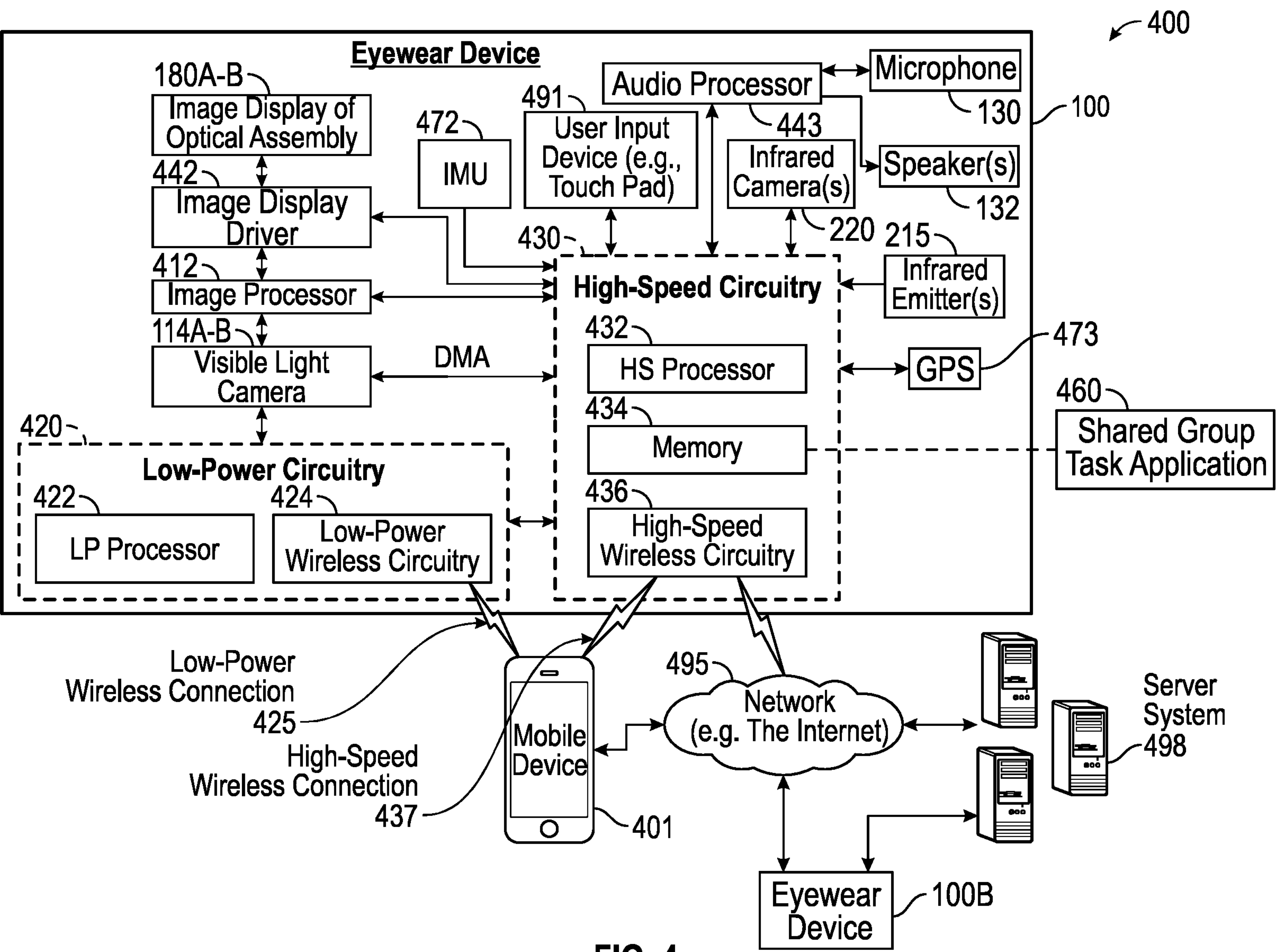
FIG. 4 is a functional block diagram of an example augmented reality production system including a wearable device (e.g., an eyewear device) and a server system connected via various networks.

FIG. 4 is a functional block diagram of an example interactive augmented reality system 400 that includes a wearable device (e.g., an eyewear device 100), a mobile device 401, and a server system 498 connected via various networks 495 such as the Internet. The interactive augmented reality system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include an infrared emitter(s) 215 and infrared camera(s) 220 for eye tracking.

The eyewear device 100 further includes two image displays 177 of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays 177 of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers 440 (e.g., one associated with the left side of the eyewear device and another associated with the right side of the eyewear device). The speakers 440 may be incorporated into the frame 105, temples 125, or corners 110 of the eyewear device 100. The one or more speakers 440 are driven by audio processor 443 under control of low-power circuitry 420, high-speed circuitry 430, or both. The speakers 440 are for presenting audio signals including, for example, a beat track. The audio processor 443 is coupled to the speakers 440 in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 220, the image processor 412, and images generated for display 177 by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
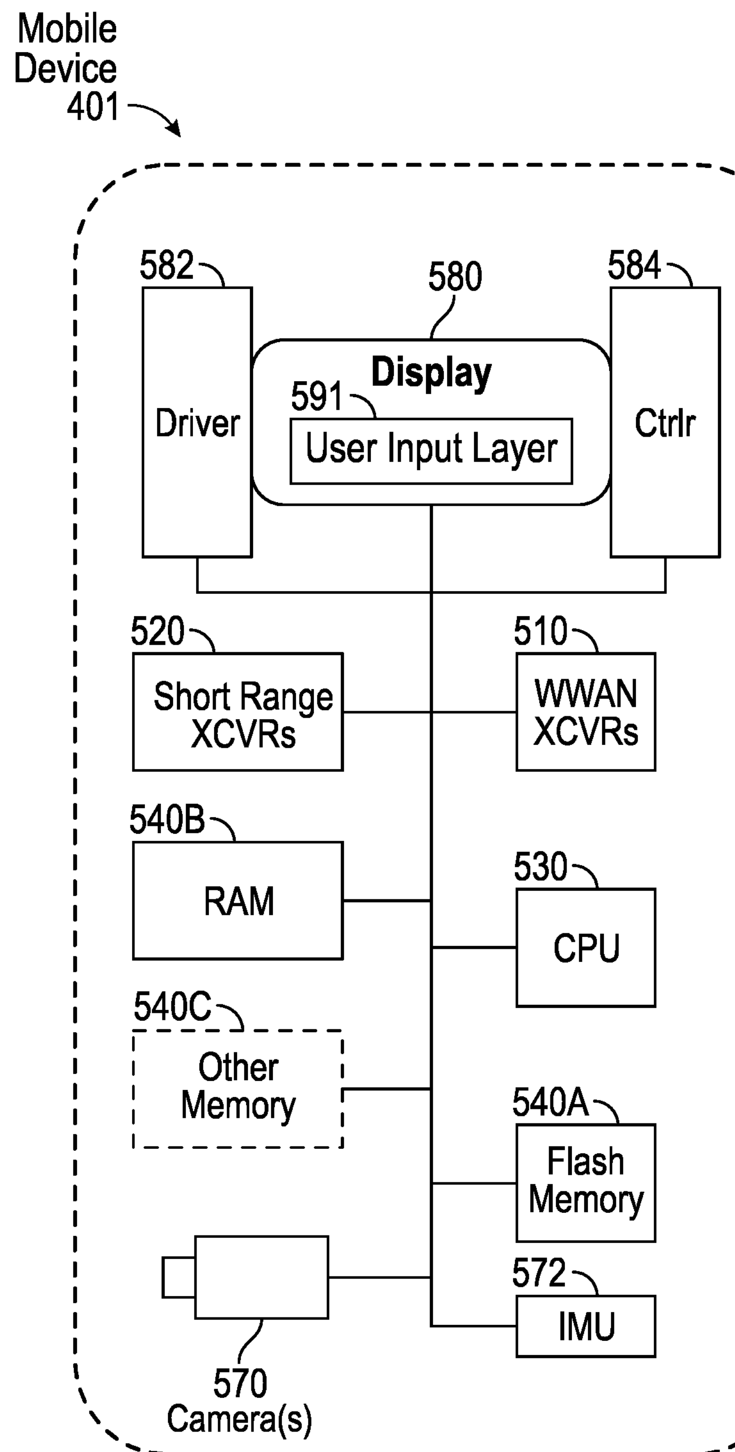
FIG. 5 is a diagrammatic representation of an example hardware configuration for a mobile device of the augmented reality production system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with one or more eyewear devices 100 and a mobile device 401.

The output components of the eyewear device 100 include visual elements, such as the left and right image displays 177 associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays 177 of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The interactive augmented reality system 400, as shown in FIG. 4, includes a computing device, such as mobile device 401, coupled to an eyewear device 100 over a network 495. The interactive augmented reality system 400 includes a memory for storing instructions and a processor for executing the instructions. Execution of the instructions of the interactive augmented reality system 400 by the processor 432 configures the eyewear device 100 to cooperate with the mobile device 401, and also with another eyewear device 100 over the network 495. The interactive augmented reality system 400 may utilize the memory 434 of the eyewear device 100 or the memory elements 540A, 540B, 540C of the mobile device 401 (FIG. 5).

The interactive augmented reality system 400 may also utilize the memory 434 of a separate remote eyewear device 100B for collaboration of data, such as when executing a shared application 460 (FIGS. 6A, 6B, 8A and 8D). Also, the interactive augmented reality system 400 may utilize the processor elements 432, 422 of the eyewear device 100 or the central processing unit (CPU) 530 of the mobile device 401 (FIG. 5). The interactive augmented reality system 400 may also utilize the processor elements 432, 422 of the eyewear device 100B for shared processing, such as when executing a shared application 460 (FIGS. 6A, 6B, 8A and 8B). In addition, the interactive augmented reality system 400 may further utilize the memory and processor elements of the server system 498. In this aspect, the memory and processing functions of the interactive augmented reality system 400 can be shared or distributed across the eyewear device 100, the mobile device 401, and the server system 498.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 891 for receiving input (by touch, multi-touch, or gesture, and the like, by hand, stylus or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, position information received from a GPS unit 473, or a combination of two or more of such sensor data, or from other sensors providing data useful in determining positional information.

Figure 6A:
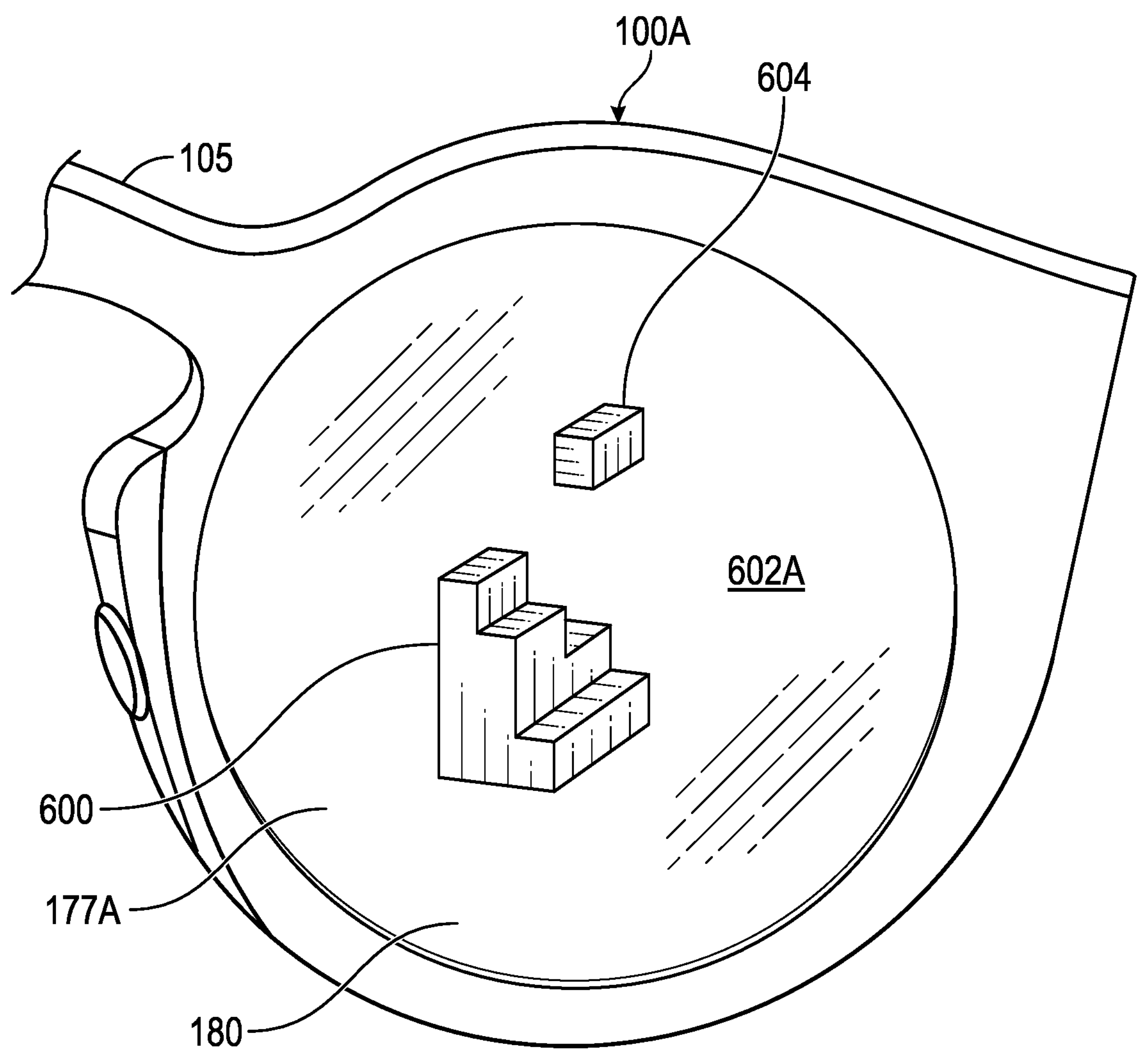
FIG. 6A illustrates a virtual scene displayed by eyewear operated by a first user A in a first example.
Figure 6B:
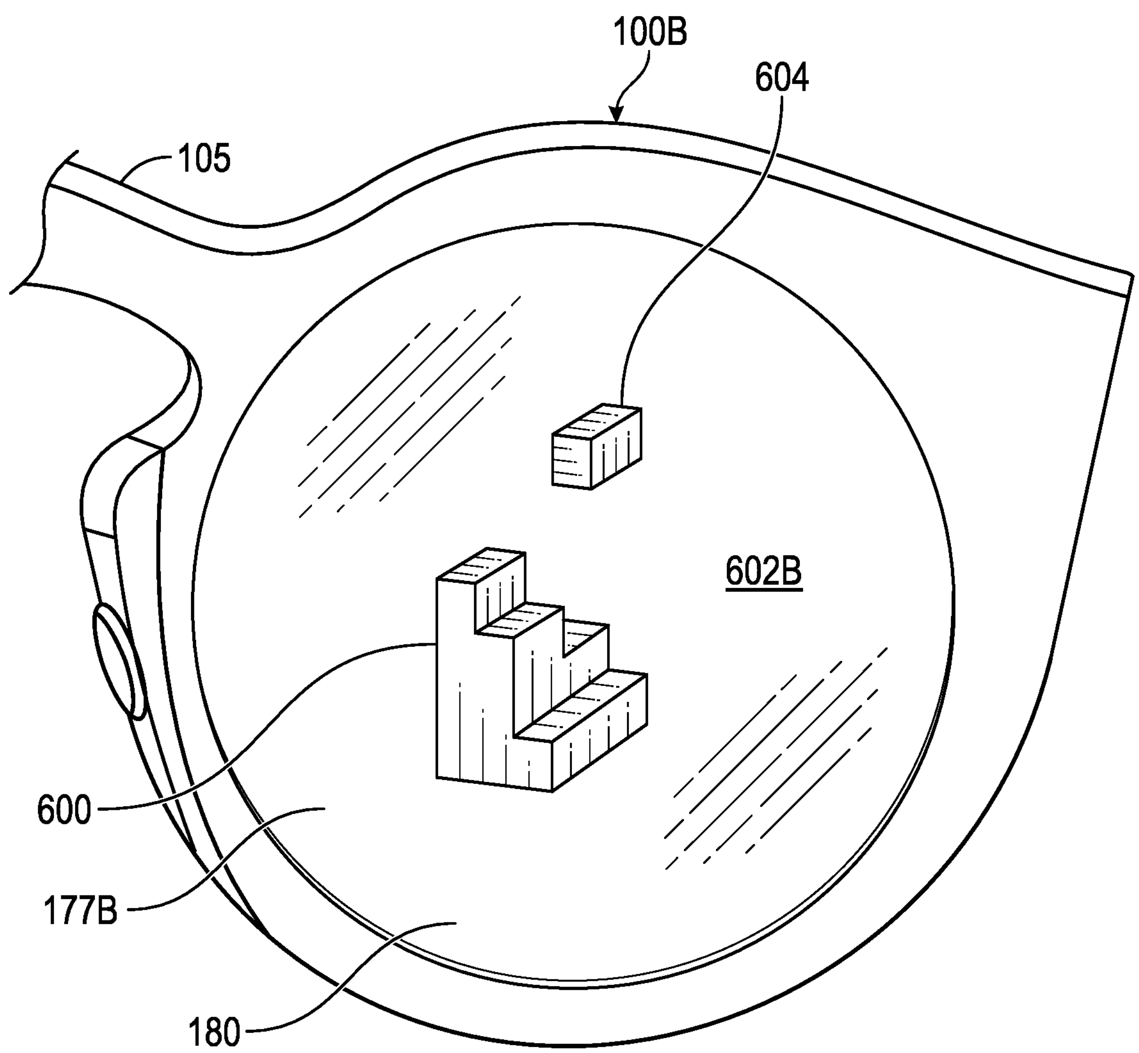
FIG. 6B illustrates a virtual scene displayed by eyewear operated by a second user B in the first example.

FIG. 6A and FIG. 6B illustrate a first example of the operation of the shared group task application 460 operable on each eyewear, to create an augmented reality experience in which a first user A of a first eyewear device 100A and a second user B of a second eyewear device 110B can each view, manipulate, and edit one or more virtual objects in a shared image that a viewable to each user. This shared group task application 460 is a remote async game experience that enables two or more users of respective eyewear to collaborate and remotely interact in a virtual environment by working together. In an example, first user A and second user B may be friends or colleagues that interact via the respective eyewear to jointly generate and modify one or more virtual objects in the shared image, such as a virtual scene.

FIG. 6A illustrates a display 177A of the first eyewear device 100A showing a virtual object 600 in a first frame of reference, shown as a virtual scene 602A, viewable by a first user A. FIG. 6B illustrates a display 177B of the second eyewear device 100B displaying the same virtual object 600 in a second frame of reference, shown as a virtual scene 602B, viewable by a second user B. The displayed virtual scenes 602A and 602B are identical to each other, and thus mirror each other. Each user A and user B can manipulate the displayed virtual object 600, such as by using the input components, such as touchpad 181, of the respective eyewear device 100 by tapping on another virtual object 604 and manipulating the second virtual object 604 with respect to virtual object 600. The manipulation by one user of the virtual object 600 is displayed on the display 177 of the other user eyewear device 100 as the eyewear device 100A and eyewear device 100B are synced to each other.

The input components of the eyewear device 100, such as touchpad 181, and the mobile device 401 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In an example, as shown in FIG. 6A and FIG. 6B, the virtual object 600 is illustrated as a building, and the second virtual object 604 is a building block that can be added to the virtual object 600. Likewise, the virtual object 604 can be removed from the virtual object 600, such that virtual objects can be added, manipulated, and removed as desired. The user collaboration allows the virtual objects to be jointly created and modified. Other features of a scene can also be included, such as a roadway, parks, and water.

Figure 7:
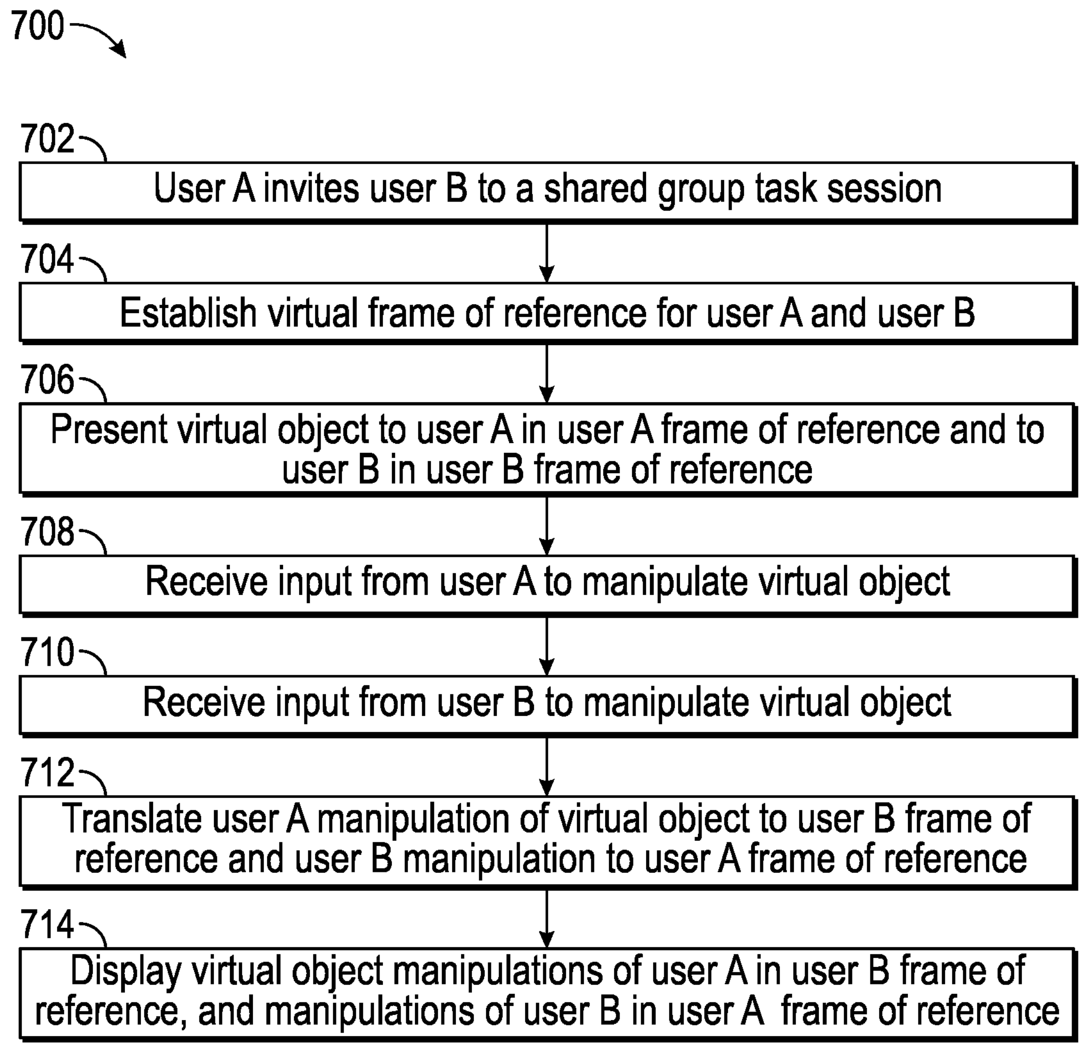
FIG. 7 is a flow diagram listing blocks in an example method of displaying virtual objects in an eyewear for first user A and second user B corresponding to FIG. 6A and FIG. 6B.

FIG. 7 is a flow chart 700 depicting a method of operation of the processor 432 executing instructions of the augmented reality shared group task application 460 described herein on a wearable device (e.g., an eyewear device 100). Although the steps of the processor 432 are described with reference to the eyewear device 100A and the eyewear device 100B, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At step 702, user A of eyewear 100A initiates the shared group task application 460, and then invites user B of eyewear 100B to join a shared group task session, such as by messaging user B via the wireless circuitry 436 and network 495. The messaging can be automatically generated by processor 432, such as when user A clicks on the name or icon of user B from a list of available users, such as a list of friends. User B can accept the invite and thereby complete the synching of the eyewear 100A and 100B by messaging and creating the shared group task session.

At block 704, the processor 432 of eyewear device 100A and the processor 432 of eyewear device 100B establish a virtual frame of reference for user A and user B, respectively.

This is shown in FIG. 6A and FIG. 6B where the virtual frame of reference is the virtual scene 602A displayed on the display 177A of eyewear 100A, and the virtual scene 602B displayed on the display 177B of eyewear 100B. The virtual scenes are identical. The user of the eyewear that first initiates the shared group task application 460 is referred to as user A.

At block 706, user A of eyewear 100A creates input via the input components to cause processor 432 to display the virtual object(s) 600 in the virtual scene 602A. The virtual object 600 can be an object selected from a list of objects stored in respective memory 434, and can also be created from scratch by user A. Responsively, the processor 432 of eyewear 100B automatically displays the virtual object 600 to user B in the virtual scene 602B of eyewear 100B. User B can also go first and create the virtual object 600 in virtual scene 602B which is then shared with user B and displayed in virtual scene 602A.

At block 708, user A creates input to the eyewear 100A, such as by manipulating the input components on the eyewear 100A, to manipulate the virtual object 600 in the virtual scene 602A. The user input can, for example, cause the virtual object 604 to be manipulated with respect to virtual object 600. The processor 432 of eyewear 100A automatically sends a message to the processor 432 of eyewear 100B indicating user A input to manipulate the virtual object 600 and virtual object 604. The processor 432 of eyewear 100A also automatically sends a message to the processor 432 of eyewear 100B indicating user A modifications of the virtual scene 602A. In the example shown in FIG. 6A, the user A input can cause the block comprising virtual object 604 to be stacked on the virtual object 600 comprising a building.

At block 710, user B likewise creates input to the eyewear 100B, such as by using the input components of the eyewear 100B, to manipulate the virtual object 600 in virtual scene 602B. The user B input can, for example, cause the virtual object 604 to be manipulated with respect to virtual object 600. The processor 432 of eyewear 100B also automatically sends a message to the processor 432 of eyewear 100A indicating the user B input to manipulate the virtual object 600. In the example shown in FIG. 6B, the input B can cause the block comprising virtual object 604 to be stacked on the virtual object 600 comprising a building.

At block 712, the processor 432 of eyewear 100B receives the message from eyewear 100A via network 495, and translates the received message to manipulate the virtual object 600 and virtual object 604 displayed by display 177B to match the manipulation illustrated by the display 177A of eyewear 100A. Likewise, the processor 432 of eyewear 100A receives the message from eyewear 100B via network 495, and translates the received message to manipulate the virtual object 600 and virtual object 604 displayed by display 177A to match the manipulation illustrated by the display 177B of eyewear 100B.

At block 714, the processor 432 of eyewear 100B causes the display 177B to display the manipulations of user A in the virtual scene 602B of eyewear 100B, and the processor 432 of eyewear 100A causes the display 177A to display the manipulations of user B in the virtual scene 602A of eyewear 100A.

Figure 8A:
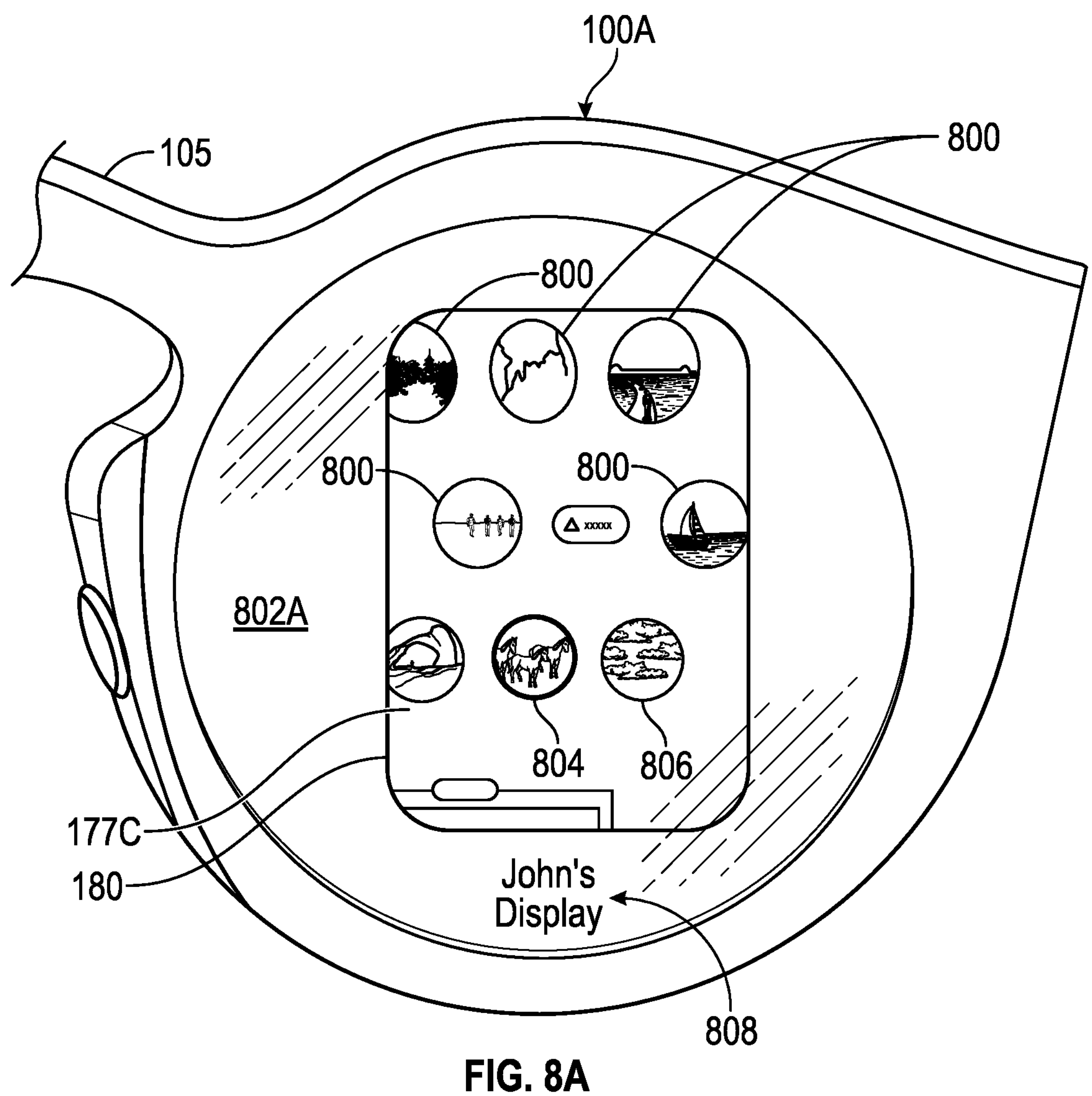
FIG. 8A illustrates a virtual scene displayed by eyewear operated by a first user A in a second example.
Figure 8B:
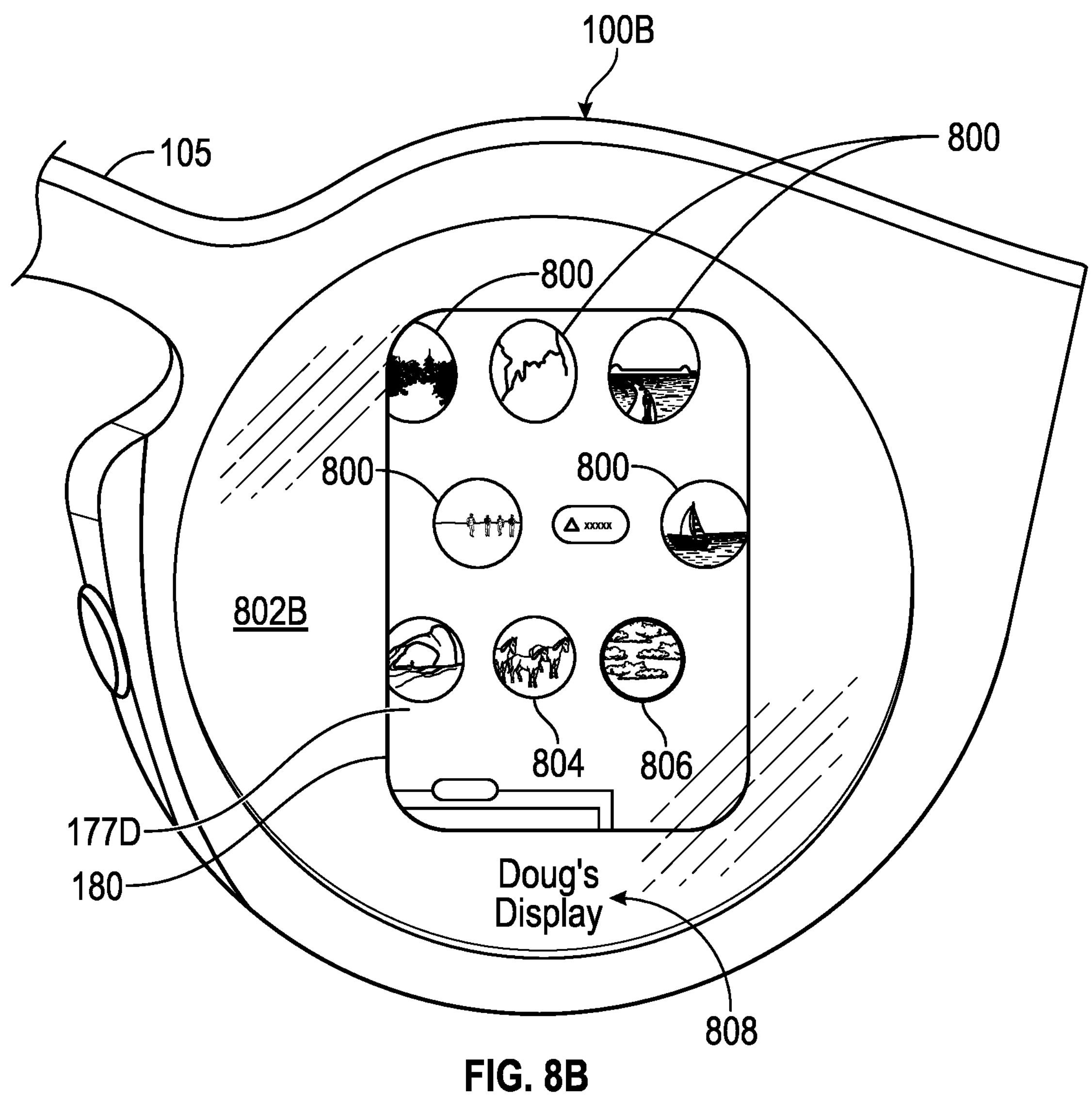
FIG. 8B illustrates a virtual scene displayed by eyewear operated by a second user B in the second example.

FIG. 8A and FIG. 8B illustrate another example of the operation of the shared group task application 460 operable on each eyewear 100A and 100B, to create an augmented reality experience in which a first user A of a first eyewear device 100A and a second user B of a second eyewear device 110B can each determine which portion of a shared image that the eyes of the other user is gazing at. This shared group task application 460 is a remote async experience that enables two or more users of respective eyewear to collaborate and remotely interact in a virtual environment by viewing and working together. In an example, first user A and second user B may interact via the respective eyewear 100 to jointly view one or more image portions or objects in a shared image, such as the same virtual scenes, to appreciate the interest of the image of the other user.

FIG. 8A illustrates a display 177C of the first eyewear device 100A displaying an image having virtual objects 800 in a first frame of reference, shown as a virtual scene 802A, viewable by a first user A. FIG. 8B illustrates a display 177D of the second eyewear device 100B displaying the same image, such as the same virtual objects 800 in a second frame of reference, shown as a virtual scene 802B, viewable by a second user B. The displayed virtual scenes 802A and 802B are identical to each other, and thus mirror each other. Each user A and user B can gaze at the different portions or objects 800 of the same image, such as the displayed virtual objects 800, wherein the eye tracker 213 including emitter 215 and infrared camera 220 determine what portion or object 800 of the virtual scene displayed on display 177 is actually being viewed by the eyes 234 of each user. For instance, each of user A and user B can view a shared browser page showing a plurality of geographical places in the Caribbean, where the place that each user is gazing at is indicated on the respective display 177 to the other user, such as by highlighting the place with color or enlarging it. User A may be gazing at Antigua, and user B may be gazing at Bonaire or Curacao, commonly known as the Dutch ABC islands. The name of each user may be described on the display 177 of the other user, as shown at 806.

The input components of the eyewear device 100, such as touchpad 181, and the mobile device 401 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

FIG. 9 is a flow chart 900 depicting another method of operation of the processor 432 executing instructions of the augmented reality application 460 described herein on a wearable device (e.g., an eyewear device 100) described with respect to FIG. 8A and FIG. 8B. Although the steps of the processor 432 are described with reference to the eyewear device 100A and the eyewear device 100B, as described herein, other implementations of the steps described, for other types of devices, will be understood by one of skill in the art from the description herein. Additionally, it is contemplated that one or more of the steps shown in FIG. 9, and in other figures, and described herein may be omitted, performed simultaneously or in a series, performed in an order other than illustrated and described, or performed in conjunction with additional steps.

At step 902, user A of eyewear 100A initiates a shared group task application 460, and then invites user B of eyewear 100B to join a shared group task session, such as by messaging user B via the wireless circuitry 436 and network 495. The messaging can be automatically generated by processor 432, such as when user A clicks on the name or icon of user B from a list of available users, such as a list of friends. User B can accept the invite and thereby complete the synching of the eyewear 100A and 100B by messaging and creating the shared group task session.

At block 904, the processor 432 of eyewear device 100A and the processor 432 of eyewear device 100B establish a virtual frame of reference for user A and user B, respectively. This is shown in FIG. 8A and FIG. 8B where the virtual frame of reference is the virtual scene 802A displayed on the display 177C of eyewear 100A, and the virtual scene 802B displayed on the display 177D of eyewear 100B. The virtual scenes are identical. The user of the eyewear that first initiates the shared group task application 460 is referred to as user A.

At block 906, user A of eyewear device 100A creates input via the input components, such as using touchpad 181, to cause processor 432 to display virtual scene 802A on display 177C having image portions and the virtual object(s) 800 in the virtual scene 802A. The image comprising the virtual scene can be retrieved from a set of stored images in memory 434, downloaded from a remote location, or by browsing a site on the internet via network 495. The virtual scene 802A with image portions and objects 800 can also be created from scratch by user A using the input components. The virtual scene 802A is automatically shared with eyewear device 100B. Responsively, the processor 432 of eyewear 100B automatically displays the virtual scene including image portions and objects 800 to user B in the virtual scene 602B of eyewear 100B. User B can also go first and create the virtual scene 802B including objects 800 which image is then shared with user B and displayed in virtual scene 602A.

At block 908, the processor 432 of each eyewear device 100 controls the respective eye tracker 213 to track the eye position of a user's eye 234 by tracking the pupil 232, and determines what image portion or object 800 that respective user is actually gazing at on respective display 177. The processor 432 of each eyewear device 100 automatically shares this eye tracking information with the processor 432 of the other eyewear device 100 using messaging via wireless device 436 and network 495.

At block 910, the processor 432 of eyewear device 100B automatically receives a message from the processor 432 of eyewear device 100A including the eye tracking information of the eye of user A via wireless circuitry 436 and network 495. This allows the processor 432 of eyewear device 100B to determine what image portion or object 800 that user A is actually gazing at on display 177C.

At block 912, the processor 432 of eyewear device 100A automatically receives a message from the processor 432 of eyewear device 100B including the eye tracking information of the eye of user B via wireless circuitry 436 and network 495. This allows the processor 432 of eyewear device 100A to determine what image portion or object 800 that user B is actually gazing at on display 177D.

At block 914, each display 177 of respective eyewear device 100A and 100B automatically displays the image portion or object 800 that the other user is gazing at in the shared image. This may be done a number of ways, for example, by highlighting, coloring, or enlarging the image portion or object 800 in the respective virtual scene 802A and 802B that the other user is gazing at. For instance, each of user A and user B can view a shared browser page showing a plurality of geographical places in the Caribbean, where the place that each user is gazing at is indicated in the respective virtual scene 802A and 802B on the respective display 177 to the other user, such as by highlighting the place with color or enlarging it. User A may be gazing at Antigua, and user B may be gazing at Bonaire or Curacao, commonly known as the Dutch ABC islands. The name of the other user(s) may be described on the display 177 of the other user, as shown at 808.

More than two users can operate respective eyewear devices 100, and jointly participate in a session where each user can see the portion of the image that each user is gazing at. Thus, limitation to eyewear operating with only one user is not to be inferred.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Eyewear, comprising:

a frame;

an optical member supported by the frame;

an eyewear display coupled to the optical member;

an eye tracker; and a processor configured to:

display a first image on the eyewear display;

determine a first portion of the displayed first image that a first user is gazing at using the eye tracker;

send a first message to a physically remote device indicating the first portion of the first image that the first user is gazing at;

receive a second message from the physically remote device indicating a second portion of the same first image that a second user of the physically remote device is gazing at; and modify the displayed first image on the eyewear display to indicate the second portion of the first image that the second user of the physically remote device is gazing at.

2. The eyewear of claim 1, wherein the first portion is a first object, and the second portion is a second object.

3. The eyewear of claim 1, wherein the modification of the displayed first image on the eyewear display comprises highlighting the second portion.

4. The eyewear of claim 1, wherein the first portion of the first image and the second portion of the first image are different.

5. The eyewear of claim 1, wherein the processor is configured to automatically send the first message to the physically remote device when the first image is viewed by the user.

6. The eyewear of claim 1, wherein the processor is configured to automatically receive the second message when the second user views the first image.

7. The eyewear of claim 1, wherein the first image is a first virtual scene, and the first portion is a first virtual object.

8. An interactive augmented reality method for use with an eyewear device having a frame, an optical member supported by the frame, an eyewear display coupled to the optical member, an eye tracker, and a processor, the processor:

displaying a first image on the eyewear display;

determining a first portion of the displayed first image that a first user is gazing at using the eye tracker;

sending a first message to a physically remote device indicating the first portion of the first image that the first user is gazing at;

receiving a second message from the physically remote device indicating a second portion of the same first image that a second user of the physically remote device is gazing at; and modifying the displayed first image on the eyewear display to indicate the second portion of the first image that the second user of the physically remote device is gazing at.

9. The method of claim 8, wherein the first portion is a first object, and the second portion is a second object.

10. The method of claim 8, wherein the modification of the displayed first image on the eyewear display comprises highlighting the second portion.

11. The method of claim 8, wherein the first portion of the first image and the second portion of the first image are different.

12. The method of claim 8, wherein the processor automatically sends the first message to the physically remote device when the first image is viewed by the user.

13. The method of claim 8, wherein the processor automatically receives the second message when the second user views the first image.

14. The method of claim 8, wherein the first image is a first virtual scene, and the first portion is a first virtual object.

15. A non-transitory computer-readable medium storing program code which, when executed, is operative to cause an electronic processor of an eyewear device having a frame, an optical member supported by the frame, an eyewear display coupled to the optical member, and an eyewear tracker to perform the steps of:

displaying a first image on the eyewear display;

determining a first portion of the displayed first image that a first user is gazing at using the eye tracker;

sending a first message to a physically remote device indicating the first portion of the first image that the first user is gazing at;

receiving a second message from the physically remote device indicating a second portion of the same first image that a second user of the physically remote device is gazing at; and modifying the displayed first image on the eyewear display to indicate the second portion of the first image that the second user of the physically remote device is gazing at.

16. The non-transitory computer-readable medium storing program code of claim 15, wherein the first portion is a first object, and the second portion is a second object.

17. The non-transitory computer-readable medium storing program code of claim 16, wherein the modification of the displayed first image on the eyewear display comprises highlighting the second portion.

18. The non-transitory computer-readable medium storing program code of claim 17, wherein the first portion of the first image and the second portion of the first image are different.

19. The non-transitory computer-readable medium storing program code of claim 15, wherein the program code, when executed, is operative to cause the electronic processor to perform the further step of:

automatically sending the first message to the physically remote device when the first image is viewed by the user.

20. The non-transitory computer-readable medium storing program code of claim 15, wherein the program code, when executed, is operative to cause the electronic processor to perform the further step of:

automatically receiving the second message when the second user views the first image.

* * * * *